United States Patent Office 3,404,756
Patented Oct. 8, 1968

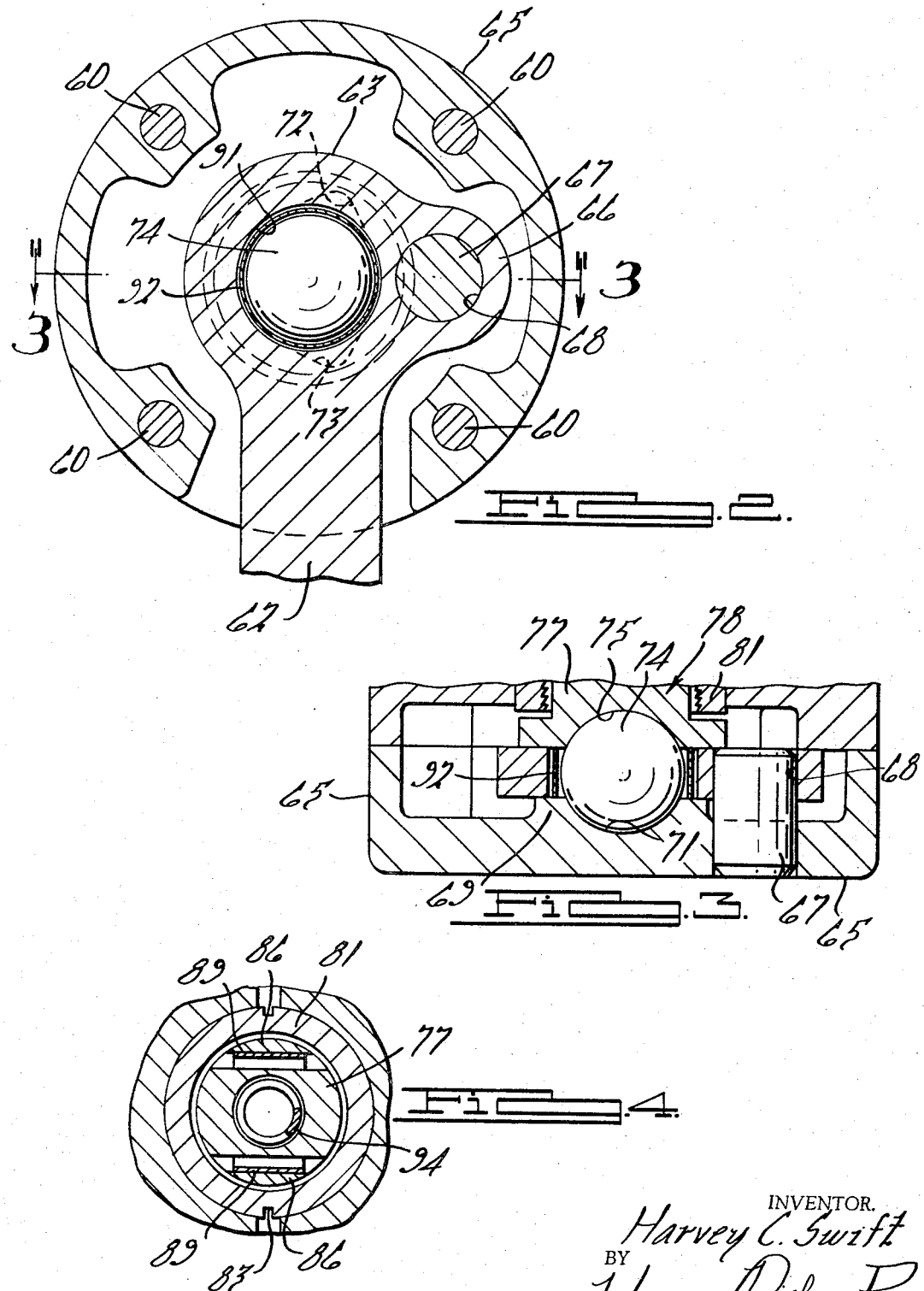

3,404,756
DISK BRAKE
Harvey C. Swift, Birmingham, Mich., assignor to Kelsey-Hayes Company, Romulus, Mich., a corporation of Delaware
Filed Mar. 1, 1967, Ser. No. 619,691
6 Claims. (Cl. 188—106)

ABSTRACT OF THE DISCLOSURE

A disk brake having a fluid motor for operating the brake as well as a hand lever that cooperates with the fluid motor for also actuating the brake. The hand lever is pivoted on an axis offset with respect to the axis of the piston. The lever is apertured at the piston axis and contains a ball member, which, when the lever is actuated, applies a mechanical braking force to the fluid motor piston.

Background of the invention

This invention pertains to a disk brake of the sliding caliper type having means for hand operating the brake as well as means for operating it by hydraulic fluid under pressure. In the invention a means is positioned generally on the axis of a piston operated by hydraulic pressure for moving this piston and thereby the brake shoes of the brake when a lever is rotated out of the neutral position.

The prior art known to the applicant includes a disk brake having a pivoted lever mounted on the housing which will move the brake shoes into engagement with a disk to be braked when the lever is rotated out of its neutral position. The lever operates to rotate a plate which is urged toward a disk to be braked by the use of an interconnecting ball and socket arrangement. This prior art is typified by United States Patent 2,526,143 issued Oct. 17, 1950, to H. P. Lambert. The present invention provides an improvement over the disk brake disclosed thereby providing a simplified structure that will act in combination with a fluid actuated piston for causing engagement of the brake shoes with a disk to be braked. The structure prevents any cocking of the brake shoes or other misalignment problems since the means which is hand operated for moving the brake shoes into engagement are located on the axis of the piston.

Summary

In this invention a mechanically operated lever is employed in conjunction with a fluid operated piston so that either may be energized to bring about braking action. The mechanically operated lever is employed to move the fluid operated piston so that the brake shoes are engaged by the action of the mechanically operated lever. This is accomplished by having a means positioned generally on the axis of the piston in the form of a ball which fits into a socket formed partially in a member which engages the fluid operated piston. This member has ramp surfaces extending from the socket which operate to move this member as the ball comes out of the socket. The ball is positioned in an aperture in the end of the lever which is pivotally mounted on the brake caliper or housing on an axis offset with respect to the axis of the piston.

Brief description of drawings

FIGURE 2 is a sectional view taken along the lines 2—2 of FIGURE 1;

FIGURE 3 is a sectional view taken along the lines 3—3 of FIGURE 2; and

FIGURE 4 is a sectional view taken along the lines 4—4 of FIGURE 1.

Figure 1:
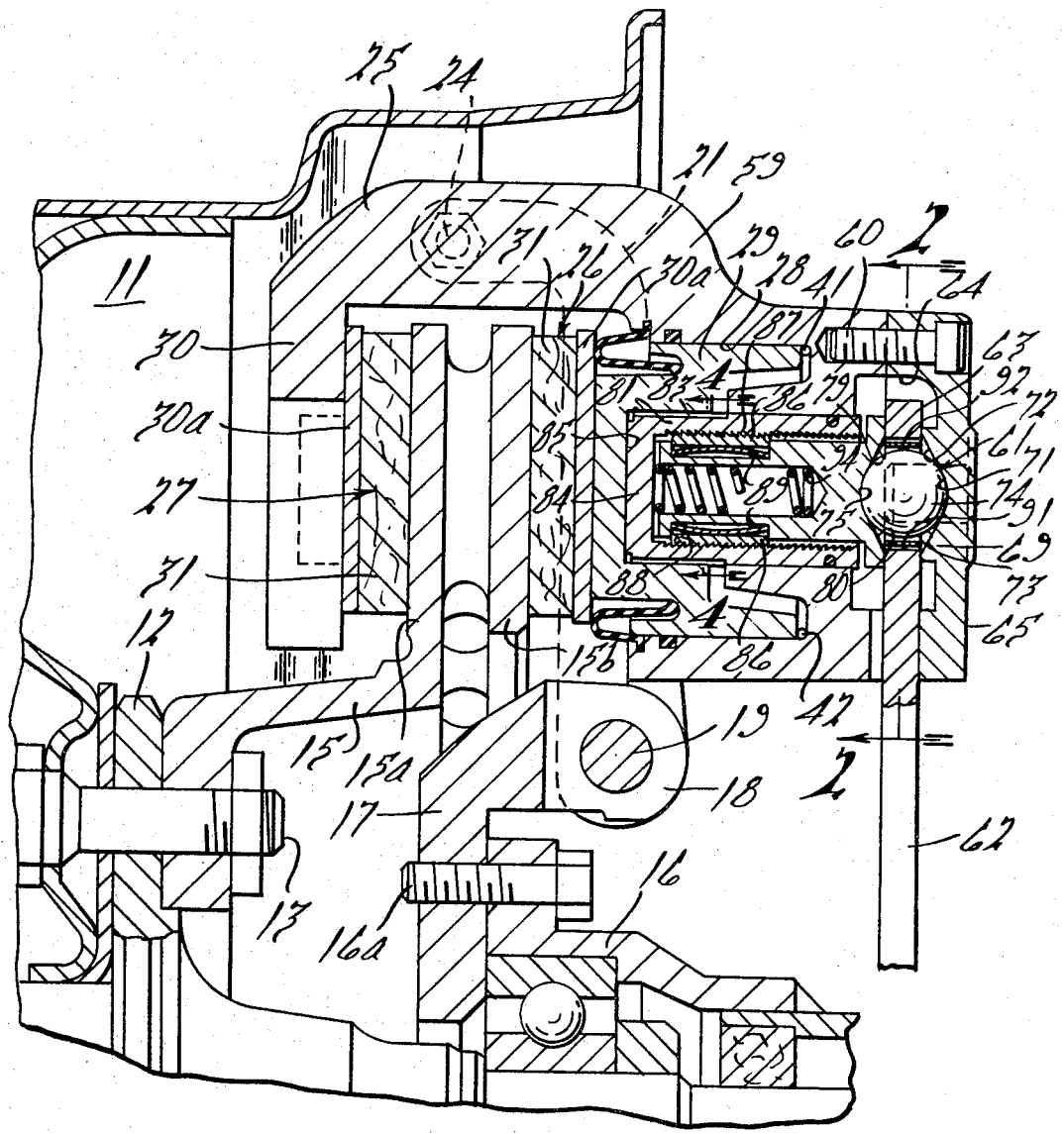
FIGURE 1 is a sectional view of the disk brake of the present invention.

Referring now to the drawings in which like reference numerals designate like parts throughout the several views thereof, there is shown in FIGURE 1 a vehicle wheel body 11 secured to an axle flange 12 by means of studs or bolt and nut assemblies 13. Also secured to the axle flange 12, as for instance, by means of the same studs or bolt and nut assemblies for rotation with the body 11 is a brake disk 15, which is of the ventilated type having spaced walls 15a and 15b.

A fixed member 16 of the axle structure has a torque member 17 secured thereto by means of bolts 16a. A spacer sleeve (not shown) is positioned on a rod 19 and between the sleeves 18. The reference character 21 indicates a pair of links rotatably journaled on the shaft or rod 19. These links are freely rotatable on the shaft or rod 19 and the upper end of each link 21 is freely journaled as at 24 to a caliper-like member 25 which straddles a portion of the periphery of the brake disk 15. The pivotal supports 24 for the caliper-like member 25 are independent of one another so that independent pivotal movement of the caliper-like member 25 on the pivots 24 is possible. The pivotal supports 24 are preferably in alignment with one another transversely of the caliper-like member 25 and are preferably arranged in radial alignment with the periphery of the rotor or brake disk whereby the caliper 25 is pivotally supported equidistant from the braking surfaces of the brake disk. The details of construction just described are shown more fully in my co-pending application Ser. No. 514,345 filed Dec. 16, 1965, now Patent No. 3,331,472.

Although the above-described mounting means for mounting a caliper on a torque plate or other stationary member may be used, any other conventional means for mounting a caliper on a torque plate may be employed.

One leg of the caliper 25 is provided with a recess 28 forming a cylinder to slidably receive a piston 29. When fluid under pressure is admitted to the recess 28, the piston is moved to the left, as viewed in FIGURE 1, and it engages a brake shoe 26 to move it against one braking face of the rotor or brake disk 15. The reaction of the movement of the piston operates in an opposite direction to move the caliper 25 so that the other side or reaction portion 30 moves against a brake shoe 27 to force it into engagement with the other braking face of the brake disk 15. Each brake shoe is provided with a backing plate 30a carrying a friction lining 31 which engages the braking surfaces of the rotor or brake disk 15.

The brake shoes may be operated either hydraulically or manually as shown in FIGURE 1. To operate the brake shoes hydraulically, fluid will be admitted behind the piston 29 through an inlet 41 and it may be withdrawn therefrom through an outlet or bleed opening 42.

The brake shoes may also be operated manually by a manually controlled means 61 that includes a lever 62 having an end portion 63 positioned within an opening 64 formed by an end plate 65 which is attached to the fluid motor portion 59 of the caliper 25 by means of screws 60. The end 63 of the lever 62 has a radially extending ear 66 that is pivotally mounted in the end plate 65 by means of a pin 67. The pin 67 is secured to the end plate 65 and the radially extending ear 66 has an aperture 68 which receives the pin 67 for rotatable movement with respect thereto. A central boss 69 is positioned centrally on the end plate 65 and it includes a socket 71 having cam surfaces 72 and 73 extending therefrom in the form of ramps. The socket 71 receives a ball 74 and this ball 74 is also received in a socket 75 positioned in an inner sleeve member 77 of an extensible member 78 and that has cooperating ramp surfaces 79 and 80 that are positioned opposite the ramp surfaces 72 and 73 positioned in the end plate 65. This extensible member also comprises an outer sleeve 81 having a longitudinally fluted portion 83 and a closed end portion 84 adapted to engage the bottom of a recess 85 formed in the piston 29.

Arranged within the outer sleeve-like member 81 is a pair of segments 86 provided with abutment teeth 87 engaging internally arranged abutment teeth 88 on the interior of the sleeve-like member 81. The segments 86 are normally urged outwardly by a pair of leaf springs 89 so as to insure engagement of the teeth 87 and 88. Arranged within the outer sleeve member 81 is a spring 94 which normally urges the inner sleeve member 77 and the segments 86 toward the right and the outer sleeve member 81 toward the left.

This arrangement described above provides a means for automatically adjusting the brakes during braking action and it is more fully described in my copending application, Ser. No. 514,345.

The ball 74 is received within a central aperture 91 positioned in the end 63 of the lever 62. A suitable annular bearing member 92 may be positioned within this aperture 91 that is engageable with the ball 74 for holding it in proper position.

When the brake 11 is to be actuated by a hand-operation, the lever 62 is rotated about the pin 67 and this action will move the ball 74 out of the sockets 71 and 75 and into engagement with either the ramp surfaces 72 and 79 or the ramp surfaces 73 and 80 in an arc as shown in FIG. 2 so that the extensible member 78 is forced to the left.

This action causes the extensible member 78 to move the piston 29 to the left thereby causing the lining 31 of the brake shoe 26 to engage the braking face of the rotor 15 and causing the brake lining 31 of the brake shoe 27 to engage the adjacent braking face of the rotor or brake disk 15. It can readily be appreciated that this action will occur since the ramps 72 and 79 and the ramps 73 and 80 form wedge-like surfaces that extend inwardly toward the opposite surfaces of the lever 62 thereby forcing the extensible member 78 to the left, as viewed in FIGURE 1. As a result of this action, the plate 65 attached to the caliper 25 will be moved to the right as the ball 74 moves on these ramps thereby moving the caliper 25 to the right to bring the lining 31 of the brake shoe 27 into engagement with the other braking face of the disk 15.

Thus, the present invention provides an extremely uncomplicated compact and inexpensive hand disk brake construction which may be operated either hydraulically or by a mechanically actuated lever that may be coupled to a hand brake.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. A disk brake for use with a rotor having braking faces on opposite sides thereof, said brake comprising a caliper having generally opposed legs lying on opposite sides of the rotor, a first brake shoe, fluid motor means carried by one of said legs and including a piston adapted to press said first brake shoe into frictional engagement with one of the faces of the rotor, a second brake shoe, said fluid motor means when energized being adapted to bias said housing in a direction to press said second brake shoe against the other face of the rotor, a lever having one end pivotally mounted on said leg carrying said fluid motor means on an axis offset with respect to the axis of the piston, means positioned generally on the axis of the piston when said lever is in the neutral position and means engageable with said piston and said last-mentioned means for moving said piston in a direction adapted to press said first brake shoe into engagement with one face of the rotor when said lever is rotated about its pivotal axis.

2. The combination of claim 1 in which said means positioned generally on the axis of the piston comprises a ball, an aperture positioned in the lever with said ball positioned in said aperture, and means engageable with said ball for moving said ball toward said piston and forcing said means engageable with said piston to move said piston and thereby said brake shoe in a direction to cause the engagement of the first brake shoe with one of the braking faces.

3. The combination of claim 2 in which said means engageable with said piston and said ball comprises a rod having an end face, a socket positioned in said rod receiving said ball, said socket including ramp surfaces positioned in alignment with the movement of said ball as said lever is rotated.

4. The combination of claim 1 in which said fluid motor portion of said caliper has an open end portion and including an end plate affixed to said fluid motor portion of the housing, said open end portion of said fluid motor portion and said end plate defining a cavity, a pin pivotally mounting said end of said lever on said end plate, said lever extending outwardly of said cavity.

5. The combination of claim 4 in which said end plate has ramp surfaces extending from the cavity and in alignment with the movement of the ball as said lever is rotated.

6. The combination of claim 5 in which said fluid motor portion of the caliper includes a rod positioned in engagement with the piston and in which ramp surfaces are positioned on said rod and extend from said cavity in alignment with the movement of the ball as said lever is rotated.

References Cited

UNITED STATES PATENTS 3,190,399 6/1965 Bowen et al. _____ 188—73
3,371,752 3/1968 Belart et al. _____ 188—73 X DUANE A. REGER, *Primary Examiner.*